(12) United States Patent
Luttrell et al.

(10) Patent No.: US 7,366,829 B1
(45) Date of Patent: Apr. 29, 2008

(54) TLB TAG PARITY CHECKING WITHOUT CAM READ

(75) Inventors: Mark A. Luttrell, Cedar Park, TX (US); Paul J. Jordan, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 365 days.

(21) Appl. No.: 10/882,806

(22) Filed: Jun. 30, 2004

(51) Int. Cl.
*G06F 12/00* (2006.01)
*G06F 13/00* (2006.01)
*G06F 13/28* (2006.01)

(52) U.S. Cl. .................... 711/108; 711/206; 714/800

(58) Field of Classification Search ................ 711/108, 711/206
See application file for complete search history.

(56) References Cited

U.S. PATENT DOCUMENTS

| | | |
|---|---|---|
| 4,816,997 A | 3/1989 | Scales, III et al. |
| 4,851,990 A | 7/1989 | Johnson et al. |
| 5,446,854 A | 8/1995 | Khalidi et al. |
| 5,465,337 A | 11/1995 | Kong |
| 5,479,627 A | 12/1995 | Khalidi et al. |
| 5,596,293 A | 1/1997 | Rogers et al. |
| 5,712,791 A | 1/1998 | Lauterbach ............ 364/489 |
| 5,717,885 A | 2/1998 | Kumar et al. |
| 5,742,792 A | 4/1998 | Yanai et al. |
| 5,761,511 A | 6/1998 | Gibbons et al. |
| 5,761,707 A | 6/1998 | Aiken et al. |
| 5,802,341 A | 9/1998 | Kline et al. |
| 5,802,561 A | 9/1998 | Fava et al. |
| 5,828,860 A | 10/1998 | Miyaoku et al. |
| 5,842,225 A | 11/1998 | Kohn |
| 5,860,147 A * | 1/1999 | Gochman et al. ........... 711/207 |
| 5,862,450 A | 1/1999 | Mandal et al. ............ 455/3.1 |
| 5,895,487 A | 4/1999 | Boyd et al. |
| 5,899,994 A | 5/1999 | Mohamed et al. |
| 5,900,011 A | 5/1999 | Saulsbury et al. |
| 5,911,071 A | 6/1999 | Jordan |
| 5,928,352 A * | 7/1999 | Gochman et al. ........... 712/200 |
| 5,933,627 A | 8/1999 | Parady |
| 5,953,010 A | 9/1999 | Kampe et al. |
| 5,956,756 A | 9/1999 | Khalidi et al. |
| 5,991,790 A | 11/1999 | Shah et al. |
| 6,006,288 A | 12/1999 | McIntyre, Jr. et al. |
| 6,016,542 A | 1/2000 | Gottlieb et al. |

(Continued)

OTHER PUBLICATIONS

R. Heald et al., "A Third-Generation SPARC V9 64-b Microprocessor," IEEE JSSC, Nov. 2000, pp. 1526-1538.

(Continued)

*Primary Examiner*—Matthew Kim
*Assistant Examiner*—Edward J Dudek
(74) *Attorney, Agent, or Firm*—Darby & Darby PC; John W. Branch (57) ABSTRACT

An apparatus and method for expediting parity checked TLB access operations is described in connection with a multi-threaded multiprocessor chip. This parity checking mechanism eliminates the need to read a CAM entry from a TLB during a TLB access by storing the tag parity value in a RAM portion of a TLB, using the CAM key input to generate a tag parity check value for a matched entry, and comparing the generated tag parity check value to the stored tag parity value to determine if there is a parity match or error.

17 Claims, 7 Drawing Sheets

U.S. PATENT DOCUMENTS

| | | | |
|---|---|---|---|
| 6,067,656 A * | 5/2000 | Rusu et al. | 714/768 |
| 6,092,154 A | 7/2000 | Curtis et al. | |
| 6,098,169 A | 8/2000 | Ranganathan | |
| 6,105,127 A | 8/2000 | Kimura et al. | |
| 6,141,692 A | 10/2000 | Loewenstein et al. | |
| 6,226,763 B1 * | 5/2001 | Fu et al. | 714/53 |
| 6,247,121 B1 | 6/2001 | Akkary et al. | 712/239 |
| 6,272,520 B1 | 8/2001 | Sharangpani et al. | 709/108 |
| 6,295,600 B1 | 9/2001 | Parady | 712/228 |
| 6,308,279 B1 | 10/2001 | Toll et al. | |
| 6,311,261 B1 | 10/2001 | Chamdani et al. | |
| 6,314,563 B1 | 11/2001 | Agesen et al. | |
| 6,374,349 B1 | 4/2002 | McFarling | |
| 6,449,694 B1 * | 9/2002 | Burgess et al. | 711/128 |
| 6,493,819 B1 | 12/2002 | Mahurin et al. | |
| 6,535,905 B1 | 3/2003 | Kalafatis et al. | |
| 6,578,137 B2 | 6/2003 | Parady | |
| 6,609,193 B1 | 8/2003 | Douglas et al. | |
| 6,625,654 B1 | 9/2003 | Wolrich et al. | 709/230 |
| 6,633,984 B2 | 10/2003 | Susser et al. | 713/201 |
| 6,647,458 B1 | 11/2003 | Glynn | |
| 6,671,707 B1 | 12/2003 | Hudson et al. | 707/206 |
| 6,700,410 B2 | 3/2004 | Ebergen | |
| 6,700,825 B1 | 3/2004 | Ebergen | 365/221 |
| 6,715,057 B1 * | 3/2004 | Kessler et al. | 711/207 |
| 6,718,438 B2 | 4/2004 | Lewis et al. | |
| 6,718,494 B1 * | 4/2004 | Jamil et al. | 714/723 |
| 6,732,143 B1 | 5/2004 | Saulsbury | |
| 6,751,655 B1 | 6/2004 | Deutsch et al. | |
| 6,772,369 B2 | 8/2004 | Smith et al. | |
| 6,779,087 B2 | 8/2004 | Saulsbury et al. | |
| 6,802,039 B1 * | 10/2004 | Quach et al. | 714/763 |
| 6,816,961 B2 | 11/2004 | Rice et al. | |
| 6,823,473 B2 | 11/2004 | Mukherjee | |
| 6,854,075 B2 | 2/2005 | Mukherjee et al. | |
| 6,862,027 B2 | 3/2005 | Andrews et al. | |
| 6,965,982 B2 | 11/2005 | Nemawarkar | |
| 7,130,967 B2 | 10/2006 | Arimilli et al. | |
| 2001/0034824 A1 | 10/2001 | Mukherjee et al. | |
| 2001/0047468 A1 | 11/2001 | Parady | 712/228 |
| 2002/0052926 A1 | 5/2002 | Bush et al. | |
| 2002/0087840 A1 | 7/2002 | Kottapalli et al. | |
| 2002/0129309 A1 | 9/2002 | Floyd et al. | |
| 2002/0162092 A1 | 10/2002 | Ravichandran | |
| 2002/0199070 A1 | 12/2002 | Chaudhry et al. | |
| 2003/0003208 A1 | 1/2003 | Lassota | |
| 2003/0047468 A1 | 3/2003 | Lentine | |
| 2003/0088610 A1 | 5/2003 | Kohn et al. | |
| 2003/0088713 A1 | 5/2003 | Mandal et al. | |
| 2003/0097518 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0131277 A1 * | 7/2003 | Taylor et al. | 714/5 |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 | 1/2004 | Damron | |
| 2004/0006633 A1 | 1/2004 | Chandra et al. | |
| 2004/0034853 A1 | 2/2004 | Gibbons et al. | 717/174 |
| 2004/0073906 A1 | 4/2004 | Chamdani et al. | |
| 2004/0088487 A1 | 5/2004 | Barroso et al. | |
| 2004/0098496 A1 | 5/2004 | Wolrich et al. | |
| 2004/0117600 A1 | 6/2004 | Bodas et al. | |
| 2004/0123028 A1 | 6/2004 | Kanai et al. | |
| 2004/0148472 A1 * | 7/2004 | Barroso et al. | 711/141 |
| 2005/0114856 A1 | 5/2005 | Eickemeyer et al. | |
| 2005/0193283 A1 | 9/2005 | Reinhardt et al. | |

OTHER PUBLICATIONS

"Igniting a Computing Revolution! Throughput Computing," Sun Microsystems Brochure.

"Introductiion to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the $27^{th}$ ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

Hennessy, John, Patterson, David., "Computer Architecture: A Quantitative Approach," Morgan Kaufmann, third edition, pp. A-68 to A77.

Handy, Jim. The Cache Memory Book. Academic Press Ltd 2nd Ed. 1998. pp. 42-45, 89-94.

Wikipedia, Thread (computer science). Version as of Jan. 5, 2004. Accessed Jan. 3, 2007. http://en.wikipedia.org/wiki/Thread_(computer_science).

Mukherjee, S. et al., "Detailed Design and Evaluation of Redundant Multithreading Alternatives," Computer Architecture, 2002, Proceedings 29th Annual International Symposium, pp. 1-12.

Reinhardt, S.K. et al., "Transient Fault Detection via Simultaneous Multithreading," Computer Architecture, 2000, Proceedings of the 27th International Symposium, 12 pages.

Watanabe, K. et al., "Exploiting Java Instruction/Thread Level Parallelism with Horizontal Multithreading," IEEE, 2001, pp. 122-129.

Hoe, J.C. "Superscalar Out-of-Order Demystified in Four Instructions," 2003, http://www.ece.cmu.edu/~jhoe/distribution/2003/wcae03.pdf, pp. 1-6.

Chen, S. et al., "Out-of-Order Memory Accesses Using a Load Wait Buffer," http://www.ece.cmu.edu/~schen1/18-741_final_report.pdf, pp. 1-8.

Kharbutli, M. et al., "Using Prime Numbers for Cache Indexing to Eliminate Conflict Misses," 10th Annual Symposium on High Performance Computer Architecture, Feb. 14-18, 2004, 12 pages.

Kalla, R. et al., "IBM Power5 Chip: A Dual-Core Multithreaded Processor," Published by the IEEE Computer Society, Mar.-Apr. 2004, pp. 40-47.

"Igniting a Computing Revolution! Throughput Computing," Sun Microsystems Brochure, Sep. 2003.

"Introduction to Throughput Computing," Sun Microsystems whitepaper, Feb. 2003.

"UltraSPARC® IV Processor," Datasheet, Sun Microsystems, Apr. 2004.

* cited by examiner

*Figure 1*

-- Prior Art --

Figure 2a

-- Prior Art --

Figure 2b

-- Prior Art --

Figure 7 database application executes instructions about 25% of the time with the remaining 75% of the time elapsed in a stalled condition. The 25% utilization rate exemplifies the inefficient usage of resources by a single-thread processor.

TLB TAG PARITY CHECKING WITHOUT CAM READ

BACKGROUND OF THE INVENTION

1. Field of the Invention

The present invention relates generally to the field of processor or computer design and operation. In one aspect, the present invention relates to parity check operations for CAM-based buffers, such as may be used in a multithreaded processor.

2. Description of the Related Art

Figure 1:
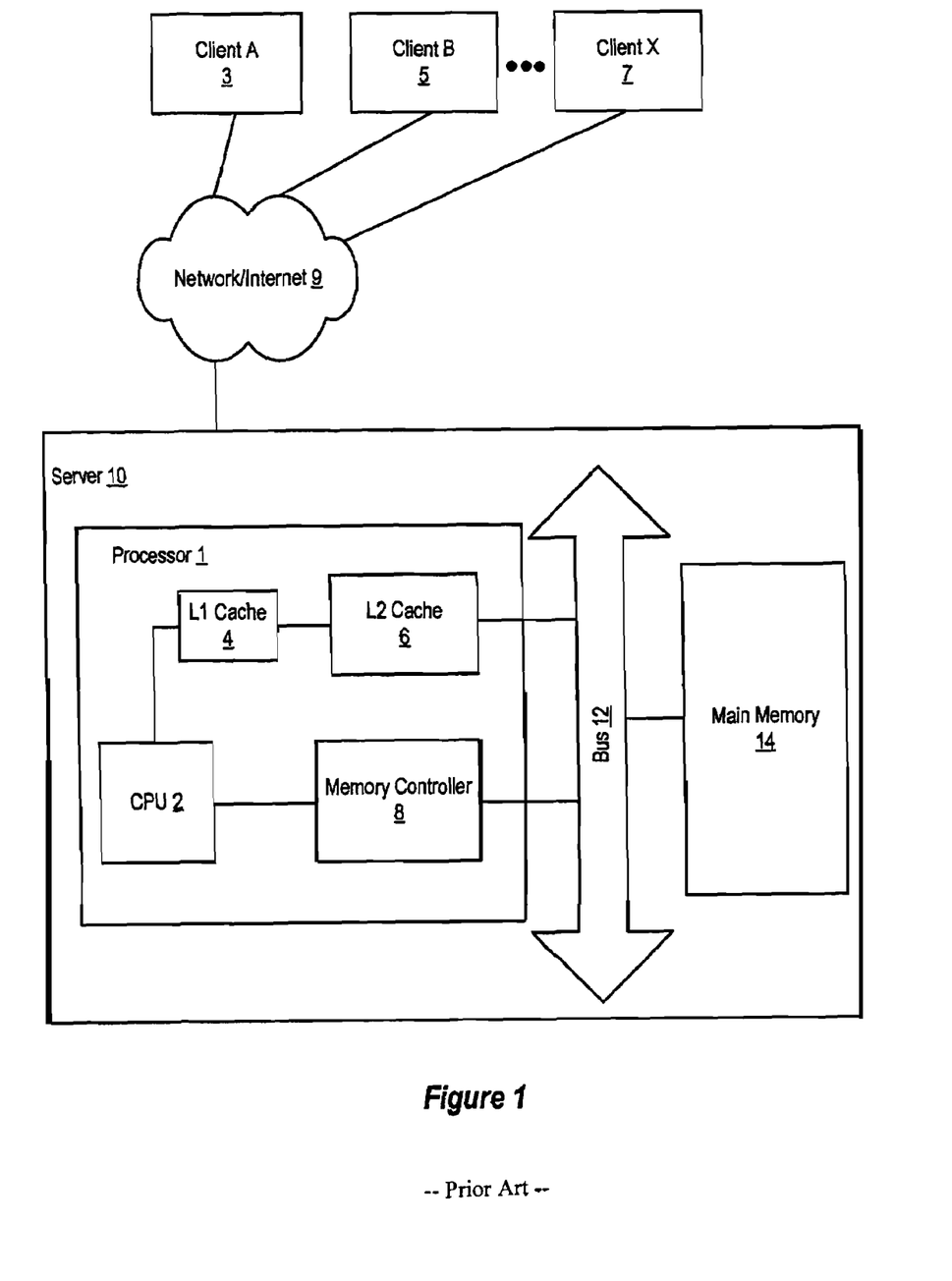
FIG. 1 illustrates a computer system in a communication network.

Computer systems are constructed of many components, typically including one or more-processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years-one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

Figure 2A:
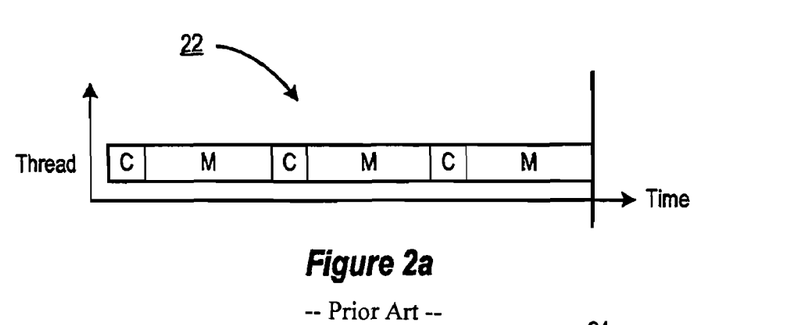
FIGS. 2a and 2b are timing diagrams respectively illustrating execution flows of a single-thread processor and a vertical multithread processor.
Figure 2B:
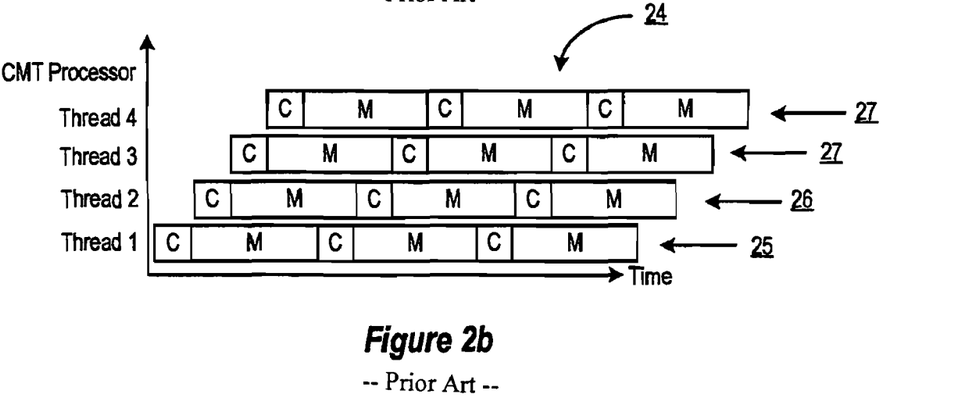

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical FIG. 2b is a highly schematic timing diagram showing execution flow 24 of similar database operations by a multithread processor. Applications, such as database applications, have a large amount of inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading can overwhelm the processor cache and memory system as loads and stores are generated more quickly by the processor than can be translated and processed by the cache or memory system.

These timing challenges are aggravated with microprocessor architectures that generate memory requests in a virtual or real address space that must be converted to a physical address space for access to the cache. Such architectures provide mechanisms for translating program visible virtual addresses to real physical memory addresses using software to map from virtual to physical memory. The mapping is typically accomplished via software-programmed tables in physical memory referred to as TSBs (Translation Storage Buffers). Each entry in the TSB is called a translation table entry (TTE) and each TTE holds translation information for a set of virtual address. These TSB entries are cached in hardware structures referred to as TLBs (Translation Lookaside Buffers). Each processor access that requires an address translation looks up the virtual address of the access in the TLB by presenting a virtual address to a content addressable memory (CAM) as an input key, which is used to search the CAM for a match. A match causes the corresponding entry in a random access memory (RAM) array to read out information that is used to provide the physical address. If the corresponding TTE entry is found in the TLB, then TLB returns the physical address for the access.

The access time challenges described herein are only complicated when soft errors corrupt data stored in the TLBs. While there are error detection techniques available for detecting when such an error is present in a stored entry, the timing challenges are only made worse by including an error detection mechanism during TLB access operations. Conventional parity protection solutions for TLBs have attempted to store a tag parity value in the CAM portion of the TLB and use software "scrubbing" to read a CAM location and check its parity. However, CAM scrubbing cannot correct single-bit failures in all cases, and cannot detect the error at access time. Therefore, when an error is detected, it must generally be assumed that the erroneous entry has been used and software errors (typically fatal errors) will result.

Accordingly, improved memory operations for multi-threading and/or multiprocessor circuits and operating methods are needed that are economical in resources and avoid costly overhead which reduces processor performance. In addition, there is a need to efficiently provide error detection during memory access operations. There is also a need to provide an error detection mechanism, such as a parity error checker, for use with address translation operations performed during TLB accesses. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for providing tag parity error checking of an entry in a CAM without reading the CAM entry. In a selected embodiment, parity checking is expedited by checking tag parity each time a TLB access is made. By storing a tag parity value in the data array when the entry is stored in the TLB, the stored tag parity value can be quickly retrieved from the data array and compared to a generated tag parity value that is calculated from the key input to the CAM.

In accordance with various embodiments of the present invention, a method and apparatus provide for efficient parity checking of CAM entries such as used with TLBs. In an embodiment where a buffer stores a plurality of entries using a CAM array for storing a tag portion of each entry and a data array for storing a corresponding data portion of each entry, tag parity checking is provided each time any input key is provided that matches a tag portion in the CAM array. When such a matching key is presented, a stored tag parity value from the corresponding data portion is retrieved from the data array. In addition, one or more generated tag parity values are calculated, where each calculated tag parity value is calculated based on all or part of the matching key. Thus, different calculated tag parity values use different, overlapping or unique subsets of the matching key. Once a generated tag parity value is selected, it is compared with the stored tag parity value to determine if there is a parity error in the matched tag portion. The efficient technique for checking the parity of a CAM entry may be used in a variety of applications, including in any CAM-based buffer circuit, translation lookaside buffers that use CAMs to hold tags, translation circuits for translating a first addressing scheme or protocol to a second addressing scheme or protocol using CAMs, single and multi-threaded processor and multiprocessor systems, and the like.

The objects, advantages and other novel features of the present invention will be apparent to those skilled in the art from the following detailed description when read in conjunction with the appended claims and accompanying drawings.

DETAILED DESCRIPTION

As explained herein, when multiple threads use a TLB to perform multiple cache memory operations on the data and/or instruction cache of a multithreaded processor, the TLB must efficiently, quickly and accurately perform its address translation function. For purposes of providing an exemplary and not limiting description, it will be useful to describe the various aspects and embodiments of the invention herein in the context of a content addressable memory (CAM). However, the data array portion of the TLB may be used in connection with any form of memory products, including without limitation, any fully associative memory, DRAM, ROM, flash, PLA and the like, whether integrated within a VLSI system, cache or non-cache, or a stand alone memory device.

Figure 3:
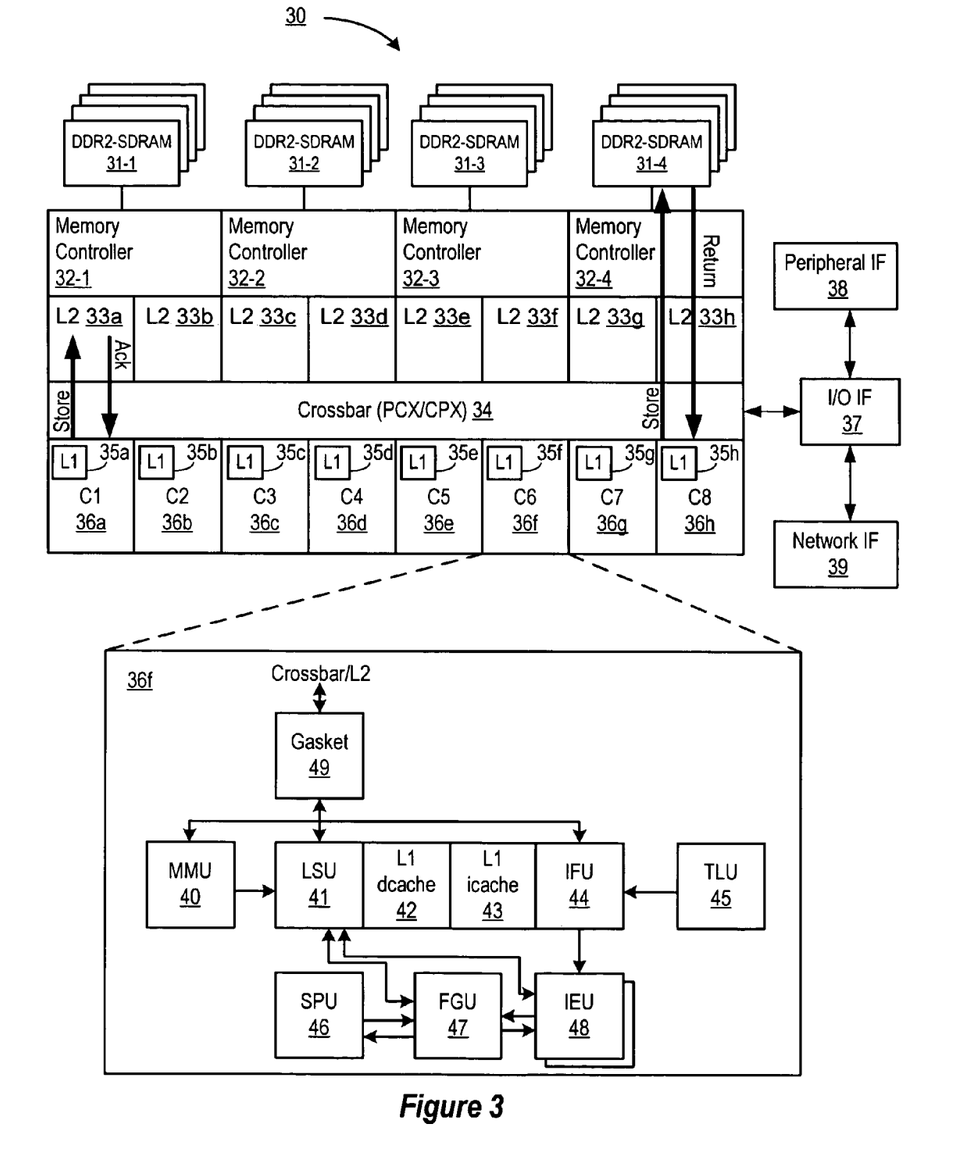
FIG. 3 illustrates a simplified schematic diagram of a processor chip having multiple processor cores for executing multiple threads, wherein each core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD or IBM. However, any other suitable single or multiple microprocessors, microcontrollers or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that core may process different numbers of threads. The example core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. FGU 47 is coupled to a stream processing unit (SPU) 46. Additionally, LSU 41, IFU 51 and MMU 40 are coupled to a gasket or interface unit 49 for interface to the crossbar 34.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. The L2 cache 33 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 33 includes an L2 data array and tag array configured to cache instructions and data for use by cores. In the illustrated embodiment, L2 cache 33 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 33 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 33 may be implemented in some embodiments as a writeback cache in which written (dirty) data may not be written to system memory until a corresponding cache line is evicted.

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in L2 cache (i.e., a "miss"), the data is fetched from main memory 31 and a copy of the data and its address is stored in the L2 cache 33 for future access.

In some embodiments, L2 cache 33 may implement queues for requests arriving from and results to be sent to crossbar 34. Additionally, in some embodiments L2 cache 33 may implement a fill buffer configured to store fill data arriving from memory controller 32, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 33 may variously be implemented as single-ported or multi-ported (i.e., capable of processing multiple concurrent read and/or write accesses). In either case, L2 cache 33 may implement arbitration logic to prioritize cache access among various cache read and write requesters.

The L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request. Peripheral interface 38 may be configured to coordinate data transfer between processor chip 30 and one or more peripheral devices. Such peripheral devices may include, without limitation; storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment, each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36*f* employing fine-grained multithreading, instructions from different threads may occupy adjacent pipeline stages, such that instructions from several threads may be in various stages of execution during a given core processing cycle.

Figure 4:
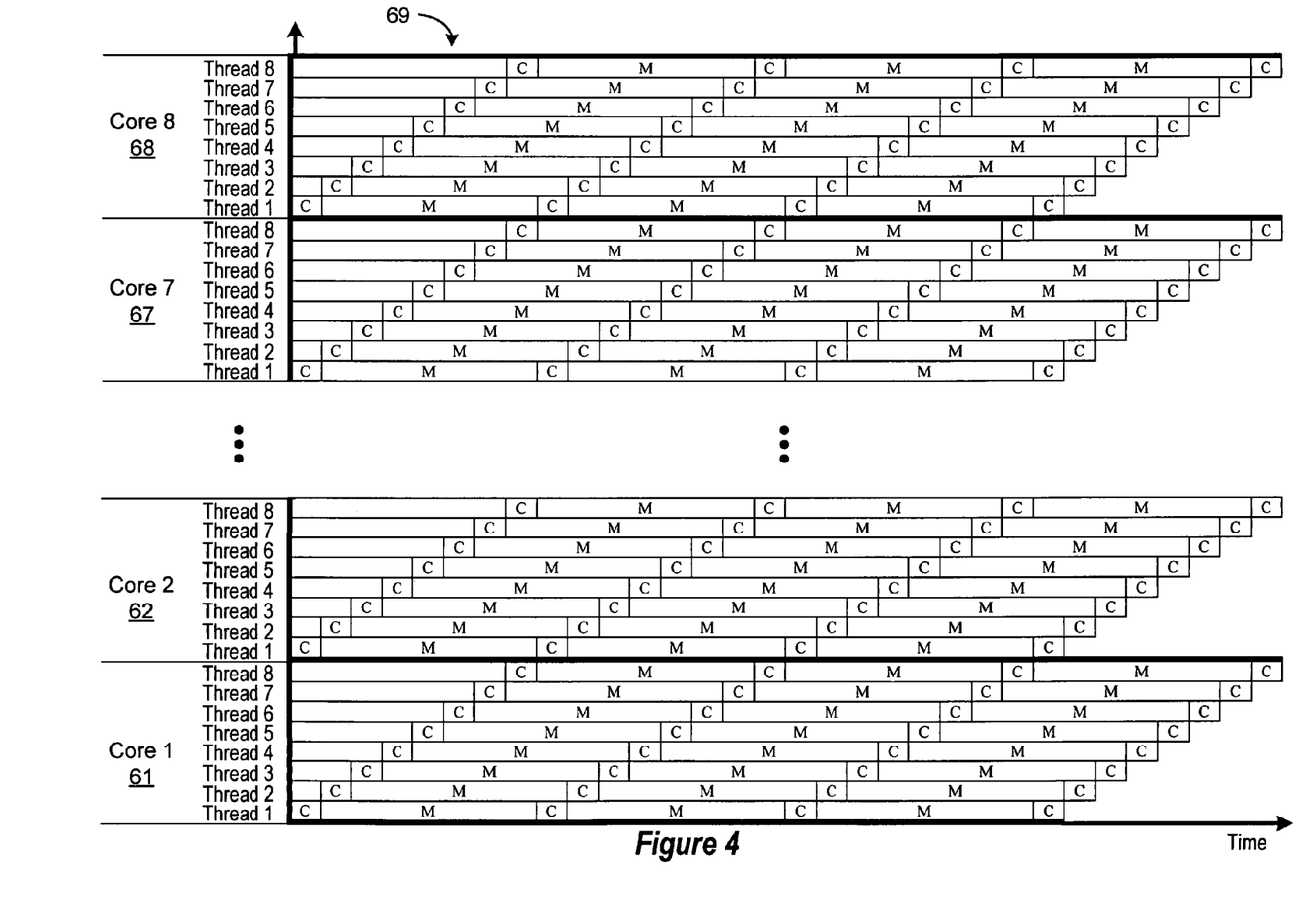
FIG. 4 is a timing diagram illustrating an execution flow of a vertical and horizontal multithread processor in accordance with an illustrative embodiment of the invention.

FIG. 4 is a timing diagram illustrating execution flow of a vertical and horizontal multithread multiprocessor embodiment of the invention using a high throughput architecture with eight processor cores 61-68, each having eight threads. In FIG. 4, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require a memory system that can process multiple references or threads simultaneously, including processing parity checking operations. For example, cache memory operations must be coordinated so that address translations using TLBs have a quick and efficient parity checking technique.

In accordance with a selected embodiment of the present invention, the processor cores can be replicated a number of times in the same area. This is also illustrated in FIG. 4, which illustrates the timing diagram for an execution flow of a horizontal threaded processor using a technique called chip multiprocessing. This technique combines multiple processor cores on a single integrated circuit die. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 4 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multithreading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can process multiple references or threads simultaneously, including processing parity checking operations. For example, cache memory operations must be coordinated so that address translations using TLBs have a quick and efficient parity checking technique. The challenges presented in managing the TLB operations are elevated when the processor core must handle multiple threads on the same core.

Figure 5:
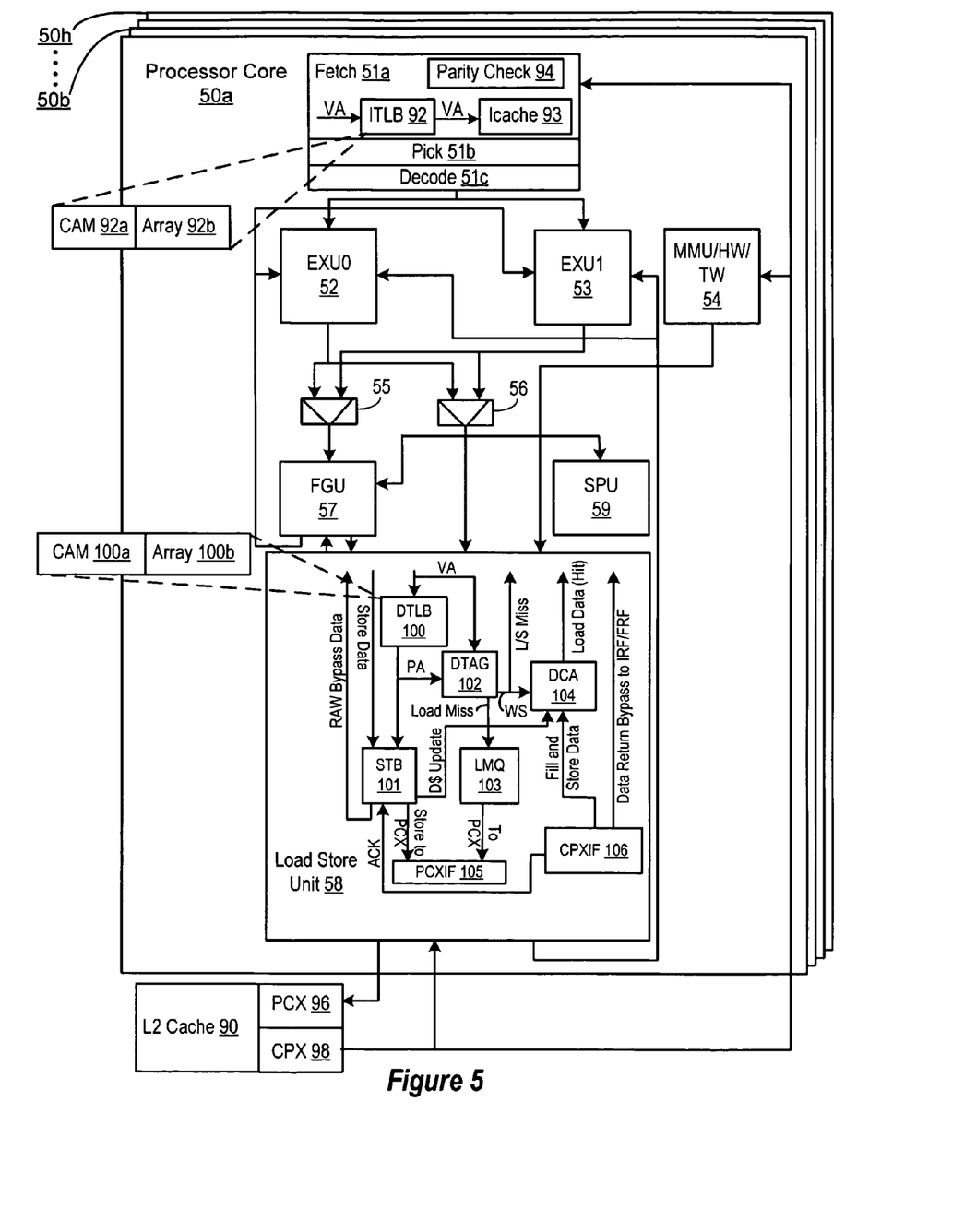
FIG. 5 is a simplified schematic block diagram of a processor core in which tag parity checking is provided in accordance with various embodiments of the invention.

The present invention may be applied in a variety of applications to efficiently check parity in CAM-based data structures, such as translation lookaside buffers that are used to by translate a first addressing scheme or protocol (e.g., using virtual addresses) to a second addressing scheme or protocol (e.g., using physical addresses). While translation lookaside buffers may be used throughout a processor to manage cache accesses, FIG. 5 depicts two examples of TLBs in a processor core 50*a* in which parity protection is provided, including an Instruction Translation Lookaside Buffer (ITLB) 92 in the instruction fetch unit (IFU) 51*a* and a Data Translation Lookaside Buffer (DTLB) 100 in a load store unit 58. In particular, the depicted core 50*a* includes an IFU 51*a* that is coupled to a memory management unit (MMU) 54 and at least one instruction execution unit (EXU) 52, 53. The instruction fetch unit 51*a* may include logic configured to translate virtual data addresses (VA) generated by the fetch unit 51*a* to physical addresses (PA), such as an ITLB 92, and also includes a parity check unit 94. Each of execution units 52, 53 is coupled via connection circuits 55, 56 to both a floating point/graphics unit (FGU) 57 and a load store unit (LSU) 58. FGU 57 is coupled to a stream processing unit (SPU) 59. Additionally, LSU 58, IFU 51*a* and MMU 54 are coupled directly or indirectly to the L2 cache 90 via crossbar 96, 98. In operation, the IFU 51*a* retrieves instructions for each thread, performs an address translation using the ITLB 92 (if necessary) and stores them in an instruction cache 93 and instruction buffers (not shown) in the IFU 51*a*. Pick unit 51*b* then selects two instructions to execute among eight different threads, and provides the instructions to the decode unit 51*c* which decodes one instruction each from two thread groups per cycle and supplies the pre-decoded instruction to the execution units 52, 53. Each integer execution unit includes an arithmetic logic unit (ALU), shifter, integer register files for processing and storing thread status information. Execution unit results are supplied via selection circuits 55, 56 to the shared FGU 57 and LSU 58. The shared LSU 58 handles memory references between the processor core, the L1 data cache and the L2 cache. As depicted, LSU 58 includes a store buffer (STB) 101 for holding all outstanding store instructions. LSU 58 may also include a load miss queue (LMQ) 103 configured to store records of pending memory accesses that have missed in the L1 data cache 102, 104. Additionally, in some embodiments LSU 58 may include logic configured to translate virtual data addresses generated by execution units 52, 53 to physical addresses, such as a DTLB 100. For additional details concerning the design and operation of the processor core and its constituent resources, see co-pending U.S. patent application Ser. No. 10/880,488, entitled "Apparatus And Method For Fine-Grained Multi-threading In A Multi-Pipelined Processor Core," filed Jun. 30, 2004, and assigned to Sun Microsystems, which is hereby incorporated by reference in its entirety.

Figure 6:
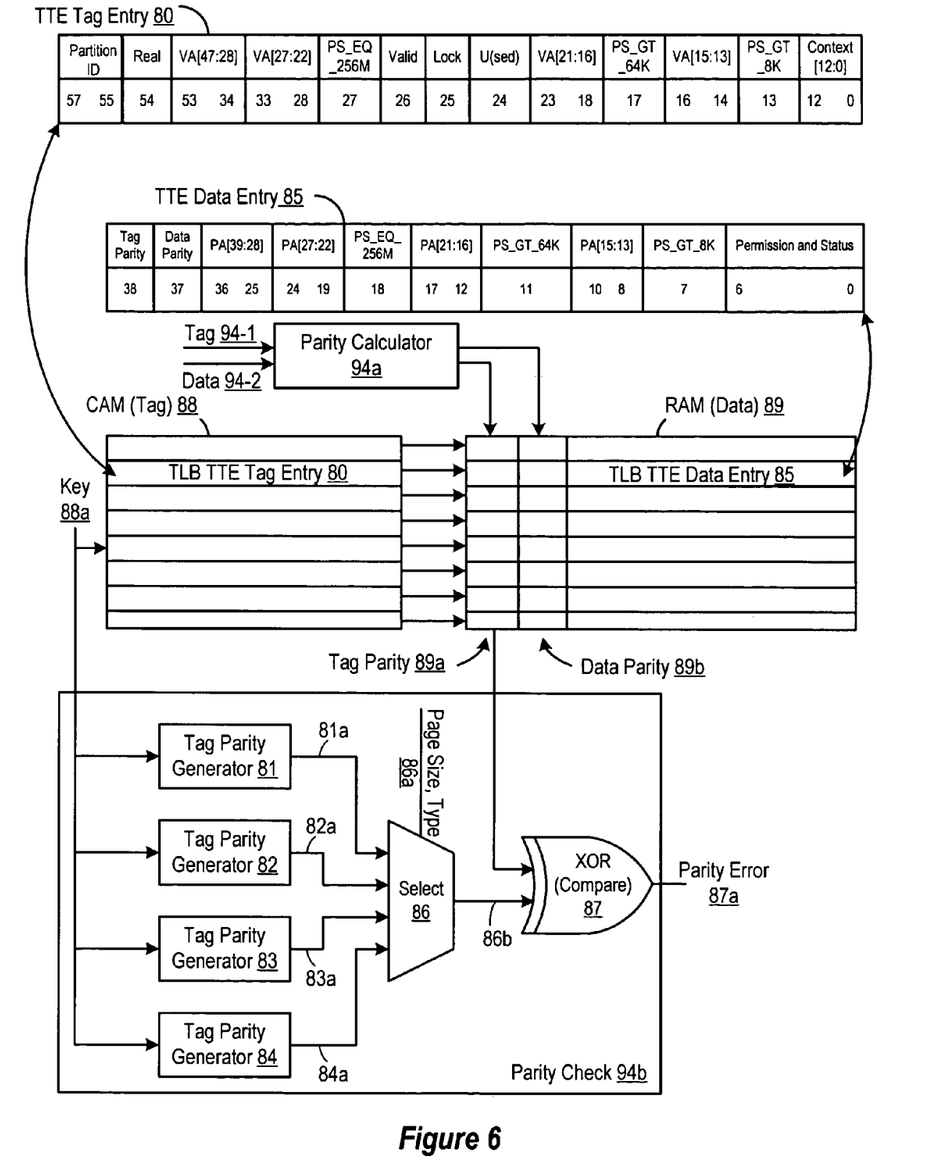
FIG. 6 depicts an exemplary TLB system in which error protection is provided in accordance with various embodiments of the present invention.

Turning now to FIG. 6, an exemplary TLB system is depicted in which error protection is provided in accordance with various embodiments of the present invention. The TLB (e.g., ITLB 92) may be constructed with a CAM 92*a* (see FIG. 5) for storing TLB tag entries, each of which contains real or virtual address information, along with information identifying the translation type and page attributes. The TLB is also constructed with a RAM 92*b* (see FIG. 5) for storing the TLB data entries which contain the physical address information, along with information identifying the page attributes and other status information. The stored translation and page attribute information in the TLB entries are used to support multiple virtual memory page sizes in order to efficiently map both large and small memory regions into the address spaces of a process. For example, a TLB may support four virtual address page sizes (8 KB, 64 KB, 4 MB and 256 MB) by holding translations of all four sizes concurrently. In operation, a TLB is used to cache software-programmed translation storage buffers (TSBs) or tables from physical memory which are used to map the virtual memory addresses to physical memory addresses. Each processor core access that requires an address translation (typically each instruction fetch and data access) looks up the virtual address of the access in the TLB. If the address tag hits in the TLB, the TLB returns the physical address where the item resides.

To protect against data storage errors in the address translation, the data array portion (e.g., 89) of the TLB (e.g., ITLB 92) may be parity protected by storing a data parity bit 89*b* as part of the TLB TTE data format (e.g., "Data Parity" at bit position 37 in TTE 85). For example, a parity calculator 94*a* calculates the data parity result 89*b* for the data entry 85, and stores the result 89*b* in the data array 89 (e.g., at bit position 37 in the example TLB TTE data entry 85). Because of the RAM structure of the data array 89, it is a relatively straightforward process to determine if the data entry 85 contains a parity error, since the contents of entry 85 can quickly be read and parity checked. When a parity error is detected for a data entry, the error may be processed using any of a variety of known techniques, including removal of the erroneous entry. The TLB will then miss and the entire entry (tag and data) will be replaced.

FIG. 6 also illustrates an example error protection system for protecting against errors in the TLB tag entry that can cause address translation errors. As illustrated, the tag array portion (e.g., 88) of the TLB (e.g., ITLB 92) may also be parity protected. However, a tag parity bit should not be included in the tag array because it is difficult to read the CAM entry (e.g., 80) out of the TLB in the same cycle as a CAM lookup. Accordingly, to protect against data storage errors in the address translation, the tag array portion (e.g., 88) of the TLB (e.g., ITLB 92) may be parity protected by including a stored tag parity bit 89*a* as part of the TLB TTE data format. For example, a parity calculator 94*a* calculates the tag parity result 89*a* for the tag entry 80, and stores the result 89*a* in the data array 89 (e.g., at the "Tag Parity" field in bit position 38 in the example TLB TTE data entry 85). In this way, a selected embodiment of the present invention uses a distributed parity checking protocol to store a tag parity value in the data array, and during TLB access, checks if a parity error has occurred in the tag entry stored in the TLB memory without reading the tag entry from the CAM. With this distribution of parity data, the parity check unit 94b can perform parity checking by reading the contents of data entry 85 to retrieve the stored tag parity (e.g., bit 38) and generating a tag parity value based on the key presented to the CAM tag array 88 to determine if there was a parity error in the tag entry.

The distributed protocol takes advantage of the fact that a parity error that causes a false miss is not a problem in the TLB because the correct entry can simply be reloaded. The protocol also takes advantage of the fact that a CAM match only occurs when input data (or "key") matches the data stored in the tag. As a result, the tag parity can be calculated based on the input data (or key) and compared to the tag parity bit stored in the data array (e.g., at bit 38 of data entry 85).

While the present invention may be implemented with a parity checking unit 94 that performs both parity calculation and parity generation, persons of ordinary skill in the art will appreciate that the parity calculation and parity generation functions may also be implemented separately. This is illustrated in FIG. 6, where the parity calculation unit 94a, in the course of loading the TLB 88, 89, calculates a tag parity value 89a based on the input tag information 94-1, and also calculates a data parity value 89b based on the input data information 94-2. During TLB accesses, a separate parity check unit 94b compares the stored tag parity 89a against generated tag parity value(s) that are calculated based on the key input 88a to the CAM 88. In particular, since a CAM hit indicates that the key 88a matches the matched tag entry, the key entry 88a is used to generate a tag parity check value using the same algorithms or processes used by the parity calculator 94a. For example, if parity calculator 94a uses the Valid, VA[47:28], Real and Partition ID fields from the tag entry (bits 26 and 34 through 57 of the incoming tag 94-1) to calculate the tag parity value 89a stored in the data array 89, then the parity check unit 94b would also use bits 26 and 34 through 57 of the incoming key 88a to generate a tag parity check value that is compared to the stored tag parity value 89a (at XOR comparator 87) to determine if there is a parity error.

In an embodiment of the present invention where the TLB supports address translations for multiple page sizes and/or translation types, the parity check unit 94 performs the parity generation and comparison operations for each page size and/or translation type efficiently and quickly. In general terms, this is accomplished by calculating a plurality of calculated tag parity values (where each calculated tag parity value is calculated based on a different, overlapping and/or unique subset of the matching input key) and then selecting between the calculated tag parity values to output a single generated tag parity value in response to an indicator contained in the matching input key. With reference to the example depicted herein, when a translation entry is written to the tag 88 and data 89 portions of the TLB, the parity calculator 94a calculates the tag parity bit 89a and data parity bit 89b and stores these bits in the data portion 89 of the TLB (e.g., in TTE data entry 85). To account for different page sizes or translation types, the tag parity calculation performed by the parity calculator 94a may be based on one or more fields in the TTE tag entry 94-1. As will be appreciated, the parity calculator 94 may calculate parity by simply performing an exclusive-OR operation on the combination of the selected field bits from the entry. With reference to this example, regardless of the page size and translation type, the Partition ID, Real, VA[47:28] and Valid fields from the example TLB TTE tag 80 always factor into the tag parity calculation, and additional fields may also be included, depending on the page size or translation type. For example, a page size indication (at the PS_GT_8K, PS_GT_64K or address fields—VA[27:22], VA [21:16], VA [15:13]—from the tag entry are included in the parity calculation. In the example provided, for 256 MB pages, the VA [47:28] field is used. For 4 MB pages, the VA [47:28] and VA [27:22] fields are used. For 64 KB pages, the VA [47:28], VA [27:22] and VA [21:16] fields are used. For 8 KB pages, the VA [47:28], VA [27:22], VA [21:16] and VA [15:13] fields are used. For virtual to physical translation entries (where the Real bit is set to 0), the context field (e.g., bits 0-12 in tag entry 80) may also be included in the parity calculation. Other types of address translations may also be accommodated by the parity calculation. For example, with an entry for translating a real address to a physical address, the Real bit (e.g., bit 54 in tag entry 80) is set to 1, in which case the Context field (e.g., bits 0-12 in tag entry 80) would not be included. The final calculated tag parity value is stored in the TLB RAM (e.g., at bit position 38 of the data entry 85), which is always read for a TLB access.

Each of the tag parity generators 81-84 in the parity check unit 94b generates tag parity values using the same parity calculation algorithms as the parity calculator 94a, except that the parity is calculated from bits in the key value 88a instead of the input tag information 94-1. For example, tag parity generator 81 generates a tag parity value 81a for an 8K page address, tag parity generator 82 generating a tag parity value 82a for an 64K page address, and so on. Thus, tag parity generation may be implemented by always including a first field or subset of the input key data in the parity generation algorithm, and then including additional field(s) or subset(s), depending on the specific page size(s) or translation type(s) supported by the TLB 88, 89.

When the TLB is accessed in the course of translating an address during a cache memory operation, the parity check unit 94b generates tag parity values using the key data 88a, and compares the result to the stored tag parity values 89a stored in the data array (e.g., entry 85 in RAM 89). When the TLB supports multiple page sizes and/or translation types, parity checking is performed by separately generating (from the matching key 88a) the tag parity values for each page size, selecting from among these generated tag parity values based on page size or translation type indication contained in the key 88a, and then comparing the selected generated tag parity value 86b with the stored tag parity value 89a contained in the data array 89. In addition, it will be appreciated that the methodology of the present invention can also be extended to work with fields in which multiple keys can be presented. For example, FIG. 6 shows four separate tag parity generator units 81, 82, 83, 84, each of which generates its own tag parity value 81a, 82a, 83a, 84a as an output, though more or fewer tag parity generator units could be used. If the TLB access results in a CAM hit, an indicator 86a is obtained from the input key 88a identifying the page size of the hit entry (e.g., from bit positions 13, 17 or 27 of the key 88a). The indicator 86a is used to select the proper generated tag parity value 81a, 82a, 83a, 84a to check against the stored tag parity value 89a. For example, the page size/type indicator 86a is provided as a control line to multiplexor 86 which receives as inputs the various generated tag parity values. In response to the control line, the multiplexor 86 outputs the desired tag parity value 86b for comparison with the stored tag parity value 89a at the comparator 87, thereby generating a parity error indication 87a.

While any suitable parity error calculation algorithm may be used to calculate a tag parity value, an exemplary embodiment of the parity calculator 94a calculates a tag parity value (prty_gen) for storage in the data array by selecting from multiple calculated tag parity values, as described below:

```
prty_ctxt = ~tag[54] & ^(tag[12:0]);
prty_all = ^(key[57:54]);
prty_256m = ^{prty_ctxt, prty_all, key[53:34]};
prty_4m = ^{prty_ctxt, prty_all, key[53:28]};
prty_64k = A ^{prty_ctxt, prty_all, key[53:28], key[23:18]};
prty_8k = ^{prty_ctxt, prty_all, key[53:28], key[23:18], key[16:14]};
prty_gen = ( tag[27] &              prty_256m) |
    (~tag[27] & tag[17] &           prty_4m ) |
    (~tag[27] & ~tag[17] &  tag[13] & prty_64k ) |
    (~tag[27] & ~tag[17] & ~tag[13] & prty_8k );
``` where key[a:b] denotes bits a through b of the key entry to the tag CAM, inclusively, tag[a:b] denotes bits a through b of the tag entry, inclusively, '^' denotes XOR; '~' denotes NOT, '&' denotes AND, '|' denotes OR, and {x,y} denotes the concatenation of x and y. By way of illustration, the calculated tag parity value for the 4M page sized address translation is calculated to be equal to "prty_4m" when bit position 27 in the tag entry is "0" and bit position 17 in the tag entry is "1," where "prty_4m" is equal to the XOR combination of "prty_ctxt" and "prty_all" and bit positions 28-53 of the key entry.

In like fashion, the parity check unit 94b generates a generated tag parity check value (prty_err) for comparison with the stored tag parity value (prty_gen) using the following algorithm:

```
prty_ctxt = ~key[54] & ^(key[12:0]);
prty_all = ^(key[57:54]);
prty_256m = ^{prty_ctxt, prty_all, key[53:34]};
prty_4m = ^{prty_ctxt, prty_all, key[53:28]};
prty_64k = ^{prty_ctxt, prty_all, key[53:28], key[23:18]};
prty_8k = ^{prty_ctxt, prty_all, key[53:28], key[23:18], key[16:14]};
prty_err = ( data[18] &              prty_256m) |
    (~data[18] & data[11] &           prty_4m ) |
    (~data[18] & ~data[11] &  data[7] & prty_64k ) |
    (~data[18] & ~data[11] & ~data[7] & prty_8k );
``` where key[a:b] denotes bits a through b of the key entry to the tag CAM, inclusively, data[a:b] denotes bits a through b of the data entry to the data RAM, inclusively, '^' denotes XOR, '~' denotes NOT, '&' denotes AND, '|' denotes OR, and {x,y} denotes the concatenation of x and y. In a selected embodiment, the parity check unit 94b generates a plurality of calculated tag parity values (e.g., prty_256m, prty_4m, prty_64k, prty_8k), each calculated tag parity value being calculated based on a different subset of the first input key. For example, prty_64k is generated based on key [53:28] and key [23:18], and prty_8k is generated based on key [53:28], key[23:18], key[16:14]. Using a selection circuit (such as a multiplexer or OR-type circuit) that is controlled by key or data values (e.g., data[18], data[11] and data[7]), a generated tag parity value is selected from the plurality of calculated tag parity values for output.

Figure 7:
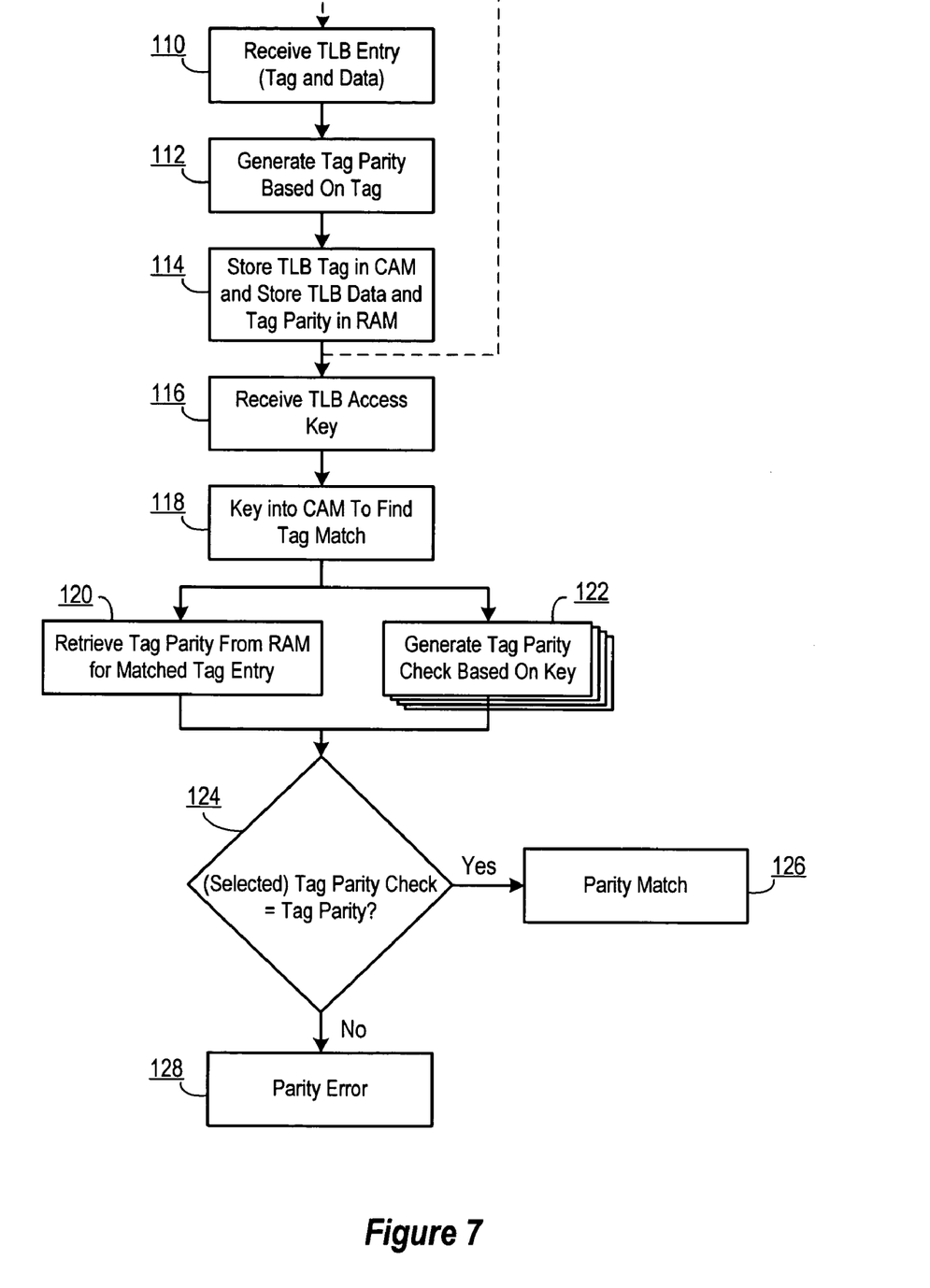
FIG. 7 depicts an exemplary flow methodology for implementing an efficient error detection function during TLB access operations.

Turning now to FIG. 7, an exemplary flow methodology for implementing an efficient error detection function during TLB access operations is illustrated. As will be appreciated, the methodology illustrated in FIG. 7 shows the steps for writing the entries into the TLB and the steps for reading an entry from the TLB. These steps may be performed for each TLB that used in each processor core to expedite parity checking during address translation operations performed in connection with a single thread or multiple threads. Moreover, when implemented on a multithreaded multiprocessor, the disclosed methodology may be implemented on each processor core to more quickly and efficiently check for parity errors in the TLB lookup operations. In addition, it will be appreciated that the methodology of the present invention may be thought of as performing the identified sequence of steps in the order depicted in FIG. 7, though the steps may also be performed in parallel, in a different order or as independent operations that separately store and or access TLB entries with parity error protection as described herein.

The description of the method can begin at step 110, where an entry is received that is to be stored in the TLB for use in translating a first addressing scheme (which may be formatted, for example, as a virtual or real address) into a second address (such as a physical address). As will be appreciated, virtual and real addressing schemes are generated by software and are used to allocate memory usage between multiple processes or operating systems, while physical addressing schemes are used by hardware to access memory. Thus, the TLB may act as a cache for address translation information that is used by the processor core to access the cache memory. Thus, the TLB entry may include a tag portion (specifying or referencing a virtual address) and a data portion (specifying or referencing a corresponding physical address).

If a tag parity value has not already been calculated or included in the TLB entry, the tag parity value is calculated, based upon some or all of the data contained in the tag portion of the TLB entry (step 112). As will be appreciated, the tag parity value can be calculated in any of a variety of ways that are suitable to provide a parity error detection function. Once generated, the TLB entry and calculated tag parity value are stored in the TLB (step 114), with the TLB tag portion being stored in the CAM portion of the TLB, and the TLB data portion and the calculated tag parity value being stored in the RAM portion of the TLB. The foregoing sequence may be repeated each time an entry is written into the TLB, as indicated by the dashed feedback loop line coupled back to step 110.

Once the TLB is loaded with one or more entries, a translation request may be presented to the TLB in the form of an access key that is input to the CAM portion of the TLB. When the TLB access request is received (step 1116), the access key is used to key into the CAM portion of the TLB to see if there is a tag match (step 118). If there is a tag match, the previously stored tag parity may be retrieved from the RAM from the data entry corresponding to the matched tag entry (step 120). Simultaneously or in sequence with step 120, a tag parity value is generated based on the access key data (step 122). This avoids the cycle time requirements to read out the matched tag entry from the CAM, thereby expediting error detection operations. As indicated in FIG. 7 and described herein, the generation of the tag parity value (step 122) may involve the simultaneous generation of multiple tag parity values where the TLB supports multiple pages sizes and translation types. Where multiple tag parity values are generated, a selection is made based upon the page size and/or translation type indicated by the input key.

Once the stored tag parity value is retrieved from the RAM and the generated tag parity value is calculated from the key data, the values are compared (decision 124). If the values are the same, a parity match is indicated (step 126), but if the values do not match, a parity error is indicated (step 128). As indicated above, protecting the CAM with parity can detect a false hit but not a false miss. A false hit may permit access to an unauthorized program or cause data corruption due to executing the wrong instructions. A false miss unnecessarily causes translation information to be requested from other resources and attendant performance loss, but does not result in data corruption. Thus, if a CAM parity error occurs on a tag match, the error may be processed using any of a variety of known techniques, including removal of the erroneous entry. The TLB will then miss and the entire entry (tag and data) will be replaced. For example, the tag entry may be invalidated, an error may be logged and a translation miss may be forced to request the missing translation information from other resources.

In the case of a false hit, it is possible that multiple entries may hit. There are many ways for multiple hits to occur. One entry with a tag with a parity error and one entry with a tag with no parity error may both hit for the same access. Likewise, two or more entries with tags with parity errors may both hit for the same access. Or, one entry without tag parity error and two or more entries with tag parity errors may hit for the same access. In all cases, parity of the individual entries cannot be checked since only one tag parity bit is provided by the RAM. The resultant tag parity error may accurately reflect the parity of one of the matching entries, or it may not, depending on the detailed implementation of the RAM. So, in all these cases, the CAM must provide an indication that multiple hits have occurred. If multiple hits have occurred, the processor can safely assume that at least one entry of the CAM has a tag parity error. The TLB can then be cleared of all entries to eliminate all erroneous entries.

As set forth above, a method and apparatus for checking tag parity for CAM hits is described. For clarity, only those aspects of the processor system germane to the invention are described, and product details well known in the art are omitted. For the same reason, the computer hardware is not described in further detail. It should thus be understood that the invention is not limited to any specific logic implementation, computer language, program, or computer. While various details are set forth in the above description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-7 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor comprising:
    at least one processor core that generates memory requests using a first addressing scheme;
    a cache memory coupled to said processor core for servicing the memory requests using a second addressing scheme;
    a translation lookaside buffer for translating the first addressing scheme to the second addressing scheme by performing a lookup operation using an input key value to generate an output value, said translation lookaside buffer comprising at least a first entry formed of a tag entry portion stored in a CAM and a data entry portion stored in a RAM, where said data entry portion in the RAM contains a stored tag parity value that is generated based on at least part of the tag entry portion, and where said translation lookaside buffer supports a plurality of types of address translation, and where the data entry portion stored in the RAM contains a stored tag parity value corresponding to the type of address translation of the translation lookaside buffer entry, and where the parity checking unit generates tag parity check values for each type of address translation and selects from among the generated tag parity check values to output the tag parity check value; and
    a parity checking unit for receiving a first input key value that has matched with the tag entry portion stored in the CAM, generating a first tag parity check value based on at least part of the first input key value, and comparing the first tag parity check value with the stored tag parity value corresponding to the matched tag entry portion to determine if there is a parity error in the matched tag entry portion, during access to the translation lookaside buffer.

2. The single chip multithreaded processor of claim 1, wherein the input key value comprises data from the first addressing scheme, and the output value comprises data from the second addressing scheme.

3. The single chip multithreaded processor of claim 1, wherein the first addressing scheme comprises a virtual addressing scheme and the second addressing scheme comprises a physical addressing scheme.

4. The single chip multithreaded processor of claim 1 wherein the first addressing scheme comprises a real addressing scheme and the second addressing scheme comprises a physical addressing scheme.

5. The single chip multithreaded processor of claim 1, wherein the cache memory comprises a first level instruction cache memory.

6. The single chip multithreaded processor of claim 1, wherein the cache memory comprises a first level data cache memory.

7. The single chip multithreaded processor of claim 1, wherein the translation lookaside buffer supports at least two page sizes in the first addressing scheme, and wherein the data entry portion stored in the RAM contains a stored tag parity value corresponding to the page size of the translation lookaside buffer entry.

8. The single chip multithreaded processor of claim 7, where the parity checking unit generates a tag parity check value for each page size supported by the translation lookaside buffer.

9. The single chip multithreaded processor of claim 8 where the parity checking unit responds to a page size indication to select between generated tag parity check values to output the first tag parity check value.

10. The single chip multithreaded processor of claim 9, where the parity checking unit compares the first tag parity check value to whichever stored tag parity value is contained in the data entry portion to determine if there is a parity error in the matched tag entry portion.

11. A translation buffer containing a plurality of translation entries for translating a first protocol to a second protocol, comprising:
a CAM array for storing a tag portion of each entry in the translation buffer;
a data array for storing a data portion of each entry in the translation buffer, said data portion including a stored tag parity value that is generated from at least part of the tag portion of said entry; and
means for parity checking a tag portion of an entry in the translation buffer by comparing the stored tag parity value from the data portion of a matched entry with a generated tag parity value that is generated from at least part of a key value that is input to the CAM array, during access to the translation buffer, without accessing the CAM array, wherein the parity checking means includes:
means for calculating a plurality of tag parity values, each calculated tag parity value being calculated based on a unique subset of the key value that is input to the CAM array; and
means for selecting between the plurality of calculated tag parity values to output the generated tag parity value.

12. The translation buffer of claim 11, wherein the translation buffer translates the first protocol to the second protocol by presenting an input key value to the CAM array to perform a lookup operation to generate an output value from the data array, where the input key value corresponds to the first protocol and the output value corresponds to the second protocol.

13. The translation buffer of claim 11, wherein the means for parity checking comprises:
means for receiving a first input key value that has matched with a tag portion of an entry stored in the CAM,
means for generating a generated tag parity value based on at least part of the first input key value, and
means for comparing the generated tag parity value with the stored tag parity value corresponding to the matched tag portion to determine if there is a parity error in the matched tag portion.

14. The translation buffer of claim 13, wherein the means for comparing comprises an exclusive OR circuit.

15. The translation buffer of claim 13, wherein the means for generating a generated tag parity value comprises:
a first means for generating a first tag parity value based on a first subset of the first input key value;
a second means for generating a second tag parity value based on a second subset of the first input key value; and
a means for selecting between the first generated tag parity value and the second generated tag parity value to output the generated tag parity value.

16. The translation buffer of claim 13, wherein the means for generating a tag parity value comprises:
means for calculating a plurality of tag parity values, each calculated tag parity value being calculated based on a different subset of the first input key; and
means for selecting between the plurality of calculated tag parity values to output the generated tag parity value in response to an indicator contained in the first input key.

17. In an integrated circuit buffer for holding a plurality of entries comprising a CAM array for storing a tag portion of each entry and a data array for storing a corresponding data portion of each entry, a method for parity checking the tag portion of each entry, during access to the integrated circuit buffer, without accessing the CAM array, comprising:
receiving an input key value that has matched with a tag entry portion stored in the CAM;
retrieving a stored tag parity value from the data portion corresponding to the matched tag entry portion;
calculating a generated tag parity value based on at least part of the input key value, wherein calculating the generated tag further includes;
calculating a plurality of tag parity values, each calculated tag parity value being calculated based on a different subset of the input key value; and
selecting between the plurality of calculated tag parity values to output the generated tag parity value in response to an indicator contained in the input key value; and
comparing the generated tag parity value with the stored tag parity value to determine if there is a parity error in the matched tag portion, during access to the integrated circuit buffer.

* * * * *